(12) United States Patent
Dhurandhar et al.

(10) Patent No.: US 11,586,917 B2
(45) Date of Patent: Feb. 21, 2023

(54) LEVERAGING SIMPLE MODEL PREDICTIONS FOR ENHANCING COMPUTATIONAL PERFORMANCE

(71) Applicant: INTERNATIONAL BUSINESS MACHINES CORPORATION, Armonk, NY (US)

(72) Inventors: Amit Dhurandhar, Yorktown Heights, NY (US); Karthikeyan Shanmugam, Elmsford, NY (US); Ronny Luss, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 401 days.

(21) Appl. No.: 16/862,480

(22) Filed: Apr. 29, 2020

(65) Prior Publication Data
US 2021/0342685 A1    Nov. 4, 2021

(51) Int. Cl.
*G06N 3/08* (2006.01)
*G06N 20/20* (2019.01)
*G06N 3/04* (2023.01)
*G06N 5/00* (2023.01)
*G06N 5/04* (2023.01)

(52) U.S. Cl.
CPC ............... *G06N 3/08* (2013.01); *G06N 3/04* (2013.01); *G06N 5/003* (2013.01); *G06N 5/04* (2013.01); *G06N 20/20* (2019.01)

(58) Field of Classification Search
CPC ........... G06N 3/08; G06N 5/003; G06N 5/00; G06N 5/04; G06N 20/20; G06N 3/0427; G06N 3/04
See application file for complete search history.

(56) References Cited

U.S. PATENT DOCUMENTS

| | | | |
|---|---|---|---|
| 10,274,933 | B2 | 4/2019 | Coffman et al. |
| 10,417,528 | B2 | 9/2019 | Ma et al. |
| 10,445,657 | B2 | 10/2019 | Qian et al. |
| 2019/0318202 | A1 | 10/2019 | Zhao et al. |

(Continued)

OTHER PUBLICATIONS

Mell, P. et al., "Recommendations of the National Institute of Standards and Technology"; NIST Special Publication 800-145 (2011); 7 pgs.

(Continued)

*Primary Examiner* — Huyen X Vo
(74) *Attorney, Agent, or Firm* — Intelletek Law Group, PLLC; Gabriel Daniel, Esq.

(57) ABSTRACT

A computer-implemented method, system, and non-transitory computer-readable storage medium for enhancing performance of a first model. The first model is trained with a training data set. A second model receives the training data set associated with the first model. The second model provides the first model with a hardness value associated with prediction of each data point of the training data set. The first model determines a confidence value regarding predicting each data point based on the training data set, and determines a ratio of the hardness value of a prediction of each data point by the second model with respect to the confidence value of the first model. The first model is retrained with a re-weighted training data set when the determined ratio is lower than a value of β.

19 Claims, 12 Drawing Sheets

(56) References Cited

U.S. PATENT DOCUMENTS

| | | | | |
|---|---|---|---|---|
| 2020/0410528 | A1* | 12/2020 | Haribhaskaran ... | G06Q 30/0246 |
| 2021/0133553 | A1* | 5/2021 | Van Den Heuvel ..... | G06N 3/04 |
| 2021/0158167 | A1* | 5/2021 | Sharma ............... | H04L 67/1097 |

OTHER PUBLICATIONS

Agarwal, D. et al., "Linear-Time Estimators for Propensity Scores"; 14th International Conference on Artificial Intelligence and Statistics (AISTATS—2011); vol. 15 of JMLR; pp. 93-100.

Subramanya, A. et al., "Confidence Estimation in Deep Neural Networks Via Density Modelling"; IEEE (2017); 6 pgs.

Alain, G. et al., "Understanding Intermediate Layersusing Linear Classifier Probes"; arXiv:1610 01644v4 [stat.ML] (2018); 13 pgs.

Ba, L. J. et al., "Do Deep Nets Really Need to be Deep?"; arXiv: 1312.6184v7 [cs.LG] (2014); 10 pgs.

Bach, S. et al., "On Pixel-Wise Explanations for Non-Linear Classifier Decisions by Layer-Wise Relevance Propagation"; PLOS One (2015); vol. 10:7; ee0130140; 46 pgs.

Bastani, O. et al., "Interpreting Blackbox Models via Model Extraction"; arXiv: 1705.08504v6 [cs.LG] (2019); 28 pgs.

Rochette, T., "Yoshua Bengio—Curriculum Learning (2009)"; (2020); 3 pgs.

Buclia, C. et al., "Model Compression"; KDD (2006); 7 pgs.

Chen, Y. et al., "Eyeriss: A Spatial Architecture for Energy-Efficient Dataflow for Convolutional Neural Networks" EECS, MIT (Date: unknown); 13 pgs.

Dehghani, M. et al., "Fidelity-Weighted Learning"; arXiv: 1711. 02799v2 [cs.LG]; (2018); 20 pgs.

Varshney, K. R., et al., "Why Interpretability in Machine Learning? An Answer Using Distributed Detection and Data Fusion Theory"; arXiv: 1806 09710v1 [stat.ML] (2018); 6 pgs.

Dhurandhar, A. et al., "Explanations based on the Missing: Towards Contrastive Explanations with Pertinent Negatives"; 32nd Conference on Neural Information Processing Systems (NIPS—2018); 12 pgs.

Dhurandhar, A. et al., "TIP: Typifying the Interpretability of Procedures"; arXiv:1706.02952v3 [cs.AI] (2018); 39 pgs.

Dhurandhar, A. et al., "Improving Simple Models with Confidence Profiles"; 32nd Conference on Neural Information Processing Systems (NIPS—2018); 11 pgs.

Freund, Y. et al., "A Decision-Theoretic Generalization of On-Line Learning and an Application to Boosting"; Journal of Computer and System Sciences (1997); vol. 55; pp. 119-139.

Frosst, N. et al., "Distilling a Neural Network Into a Soft Decision Tree"; arXiv: 1711.09784v1 [cs.LG] (2017); 8 pgs.

Furlanello, T. et al., "Born-Again Neural Networks"; arXiv:1805. 04770v2 [stat.ML] (2018); 10 pgs.

Hinton, G. et al., "Distilling the Knowledge in a Neural Network"; http://arxiv.org/abs/1503.02531v1 (2015); 9 pgs.

Guo, C. et al., "On Calibration of Modem Neural Networks"; arXiv: 1706.04599v2 [cs.LG] (2017); 14 pgs.

Lopez-Paz, D. et al., "Unifying Distillation and Privileged Information"; arXiv:1511.03643v3 [stat.ML] (2016); 10 pgs.

Molnar, C. et al., "Quantifying Model Complexity via Functional Decomposition for Better Post-Hoc Interpretability" arXiv: 1904 03867v2 [stat.ML] (2019); 12 pgs.

Montavon, G. et al., "Methods for Interpreting and Understanding Deep Neural Networks"; arXiv:1706.07979v1 [cs. LG] (2017); 14 pgs.

Reagen, B. et al., "Minerva: Enabling Low-Power, Highly-Accurate Deep Neural Network Accelerators"; Harvard University (Date: Unknown); 12 pgs.

Ren, M. et al., "Learning to Reweight Examples for Robust Deep Learning"; arXiv: 1803.09050v3 [cs.LG] (2019); 13 pgs.

Ribeiro, M. T., "Why Should I Trust You? Explaining the Predictions of Any Classifier"; arXiv: 1602.04938v3 [cs.LG] (2016); 10 pgs.

Romero, A. et al., "Fitnets: Hints for Thin Deep Nets"; http://arxiv.org/abs/1412.6550v4 (2015); 13 pgs.

Rudin, C., "Stop Explaining Black Box Machine Learning Models for High Stakes Decisions and Use Interpretable Models Instead"; Nature Machine Intelligence (2019); vol. 1; pp. 206-215.

Strubell, E. et al., "Energy and Policy Considerations for Deep Learning in NLP"; Proceedings of the 57th Annual Meeting of the Association for Computational Linguistics (2019); pp. 3645-3650.

Tan, S. et al., "Distill-and-Compare: Auditing Black-Box Models Using Transparent Model Distillation" arXiv: 1710 06169v4 [stat. ML] (2018); 8 pgs.

Gaudet, B. et al., "Learning Accurate Extended-Horizon Predictions of High Dimensional Trajectories" arXiv: 1901.03895v1 [cs.LG] (2019); 9 pgs.

Jha, D. et al., "Enhancing Materials Property Prediction by Leveraging Computational and Experimental Data Using Deep Transfer Learning"; Nature Communication (2019); 12 pgs.

Meek, C. "A Characterization of Prediction Errors"; arXiv: 1611. 05955v1 (2016); 9 pgs.

* cited by examiner

| METHOD | COMPLEX MODEL | SIMPLE MODEL | MODELS LEVERAGED |
|---|---|---|---|
| DISTILLATION | NN | NN | COMPLEX |
| PROFWEIGHT | NN | ANY | COMPLEX |
| SRATIO | ANY | ANY | COMPLEX AND SIMPLE |

FIG. 6

Algorithm 1

Input: $n$ (graded) classifiers $c_1, \ldots, c_n$, learning algorithm for simple model $\mathcal{L}_S$, dataset $D_S$ of cardinality $N$, performance gap parameter $\gamma$ and maximum allowed ratio parameter $\beta$.

1) Train simple model on $D_S$, $S \leftarrow \mathcal{L}_S(D_S, 1_N)$. (Obtain initial simple model where each input is given a unit weight.)
2) Compute (average) prediction errors $\epsilon_1, \ldots, \epsilon_n$ for the $n$ graded classifiers and store the ones that are at least $\gamma$ more accurate than the simple model i.e. $I \leftarrow \{i \in \{1, \ldots, n\} \mid \epsilon_S - \epsilon_i \geq \gamma\}$
3) Compute weights for all inputs $x$ as follows: $w(x) = \frac{\sum_{i \in I} c_i(x)}{m \cdot S(x)}$, where $m$ is the cardinality of set $I$ and $S(x)$ is the prediction probability/score for the true class of the simple model.
4) Set $w(x) \leftarrow 0$, if $w(x) > \beta$. (Limit the importance of extremely hard examples for the simple model.)
5) Retrain the simple model on the dataset $D_S$ with the corresponding learned weights $w$, $S_w \leftarrow \mathcal{L}_S(D_S, w)$
6) Return $S_w$

FIG. 7

LEVERAGING SIMPLE MODEL PREDICTIONS FOR ENHANCING COMPUTATIONAL PERFORMANCE

STATEMENT REGARDING PRIOR DISCLOSURES BY THE INVENTOR OR A JOINT INVENTOR

Dhurandhar et al., "Leveraging Simple Model Predictions for Enhancing its Performance," May 30, 2019, available at https://arxiv.org/pdf/1905.13565.pdf.

BACKGROUND

Technical Field

The present disclosure generally relates to the use of predictive modeling in computing devices, and more particularly, to the use of simple models and complex models to enhance computational performance.

Description of the Related Art

The employment of simple models, which may include but is not limited to decision trees, rule lists, or shallow neural networks, is sometimes preferred over the employment of high performance complex models for a number of reasons. Such reasons can include cases where one or more of global interpretability is desired, small data sizes are available, computational or memory constraints exist.

SUMMARY

According to various embodiments, a computer-implemented method for enhancing performance of a first model includes training the first model with a training data set. A second model receives the training data set associated with the first model and makes predictions on the training data set associated with the first model and outputs a hardness value associated with prediction of each data point. The second model transmits the training data set and the hardness values to the first model. The first model determines a confidence value regarding predicting each data point of the training data set, and determines a ratio of the hardness value of predicting the data points by the second model with respect to the confidence value of the first model.

In an embodiment, there is an operation of generating the re-weighted training data set from the training data set based on the ratio of hardness value of predicting each data point with respect to the confidence value, and discarding one or more data points so that the ratio of hardness with respect to the confidence value is higher than the value of $\beta$.

In an embodiment, the first model comprises a simple model having a decision tree that is less than or equal to a predetermined height, and the second model includes a complex model.

In an embodiment, the complex model includes a deep neural network configured to perform the re-weighting of the training data set.

In an embodiment, the first model comprises a simple model, and the complex model is one of a boosted tree, a random forest and a non-ensembled model.

In an embodiment, the training data set includes one or more classifiers, a dataset, a performance gap parameter, and a maximum allowed ratio parameter. The method further includes computing prediction errors for the one or more classifiers, and storing the classifiers having computed prediction errors at least as accurate as the performance gap parameter.

In an embodiment, the hardness value is determined by applying at least a first probe to a first network layer to determine a probability of accuracy of a prediction of an input.

In an embodiment, a second probe is applied to a second network layer, wherein the hardness value is based on a number of probes applied to respective network layers.

In an embodiment, there is a finding of an area under a curve (AUC) based on confidence value at each probe whose accuracy>$\alpha$ of the simple model for each example based on a complex neural network. The factor $\alpha$ is a margin parameter determining a weakest confidence value of the probes.

In an embodiment, there is an averaging of confidence values over a plurality of outputs of the complex model. In one embodiment, a system for enhancing performance of a first model includes a processor, and a memory coupled to the memory. The memory stores instructions to configure the processor to provide to a complex model a training data set associated with the first model, receive from the complex model a re-weighted training data set and a generated hardness value associated with prediction of a data point.

In an embodiment, the network adapter is additionally coupled to the processor and the memory. The processor is configured to provide the received re-weighted training data including the hardness value to the first model via the network adapter.

In an embodiment, the first model is a simple model having a decision tree which is less than or equal to a predetermined height.

In an embodiment, the second model is a complex model. complex model may include a deep neural network configured to perform the re-weight of the training data set.

In an embodiment, the complex model is one of a boosted tree, a random forest and a non-ensembled model.

In an embodiment, the complex model is cloud-based.

In one embodiment, a non-transitory computer readable storage medium tangibly embodies a computer readable program code having computer readable instructions that, when executed, causes a computer device to perform a method of enhancing performance of a simple model, the method includes training the simple model with a training data set. A complex model receives the training data set associated with the simple model. The complex model makes predictions on the training data set associated with the simple model and generates a hardness value associated with predicting each data point of the training data set. The training data set and the hardness value are output to the simple model, and a confidence value is determined by the simple model regarding the predicted data points based on the training data set. There is a determining of a ratio of the hardness value of predicting the data point by the complex model, with respect to the confidence value of the simple model.

The simple model is retrained utilizing the re-weighted training data set when the determined ratio is lower than a value of $\beta$.

In one embodiment, a system for enhancing predictive performance of a simple model includes a processor configured to operate a simple model. A memory is coupled to the processor, the memory storing instructions to cause the processor to perform acts including: providing to a complex model a training data set associated with the simple model; receiving the training data set and a generated hardness value associated with a prediction of each data point; and retraining the simple model utilizing a re-weighted training data set.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition to or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

FIG. 6 illustrates differences of Distillation, Profweight and SRatio methods, consistent with an illustrative embodiment.

FIG. 7 illustrates an example of an SRatio algorithm, consistent with an illustrative embodiment, consistent with an illustrative embodiment.

DETAILED DESCRIPTION

Overview

Figure 1:
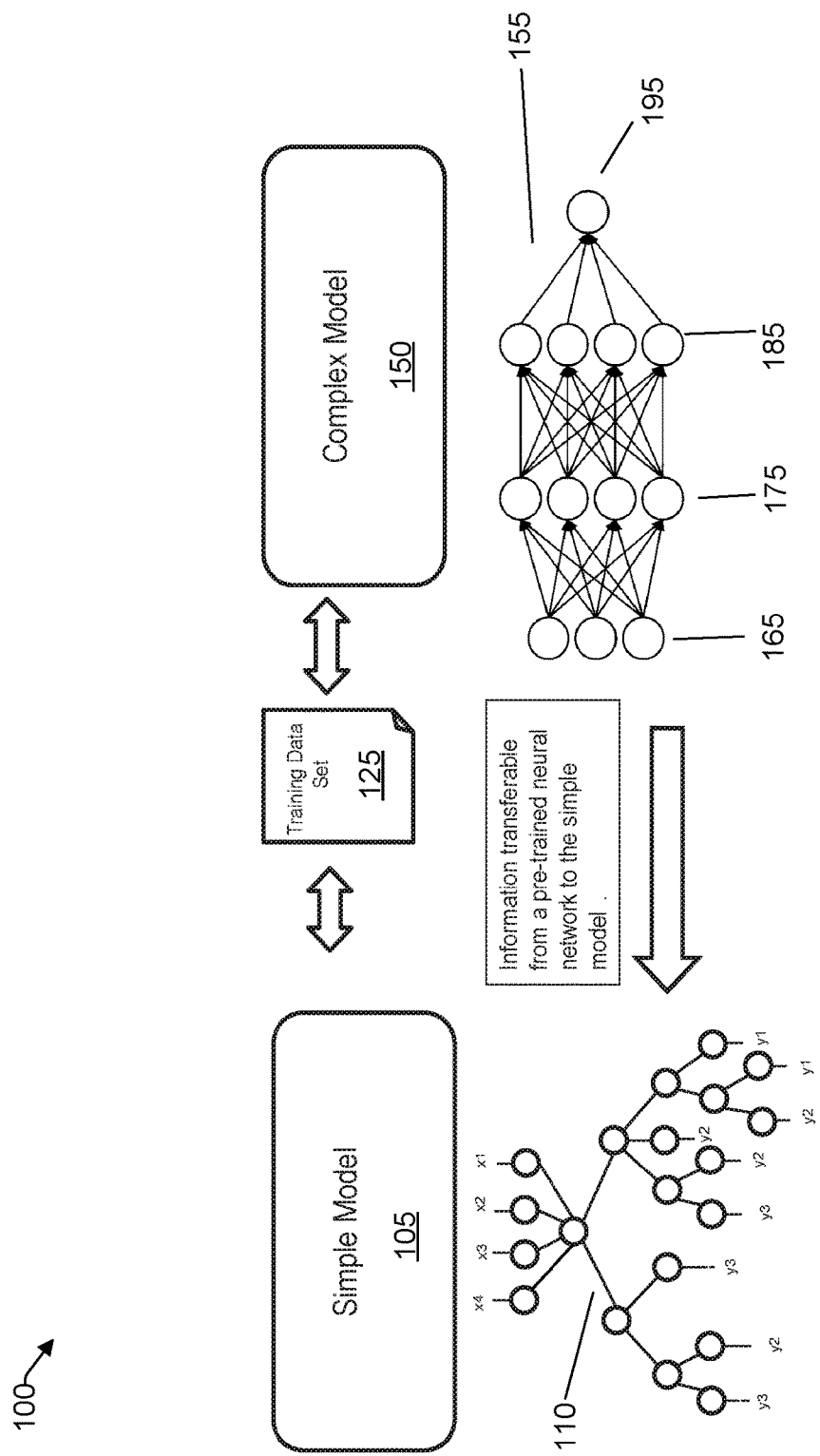
FIG. 1 is a block diagram providing an overview of a computer-implemented method to leverage simple model predictions for enhancing performance, consistent with an illustrative embodiment.

In the following detailed description, numerous specific details are set forth by way of examples to provide a thorough understanding of the relevant teachings. However, it should be understood that the present teachings may be practiced without such details. In other instances, well-known methods, procedures, components, and/or circuitry have been described at a relatively high-level, without detail, to avoid unnecessarily obscuring aspects of the present teachings.

According to the present disclosure, in cases where one might want to use a simple model, it can be beneficial to build an accurate complex model first and use it to enhance the desired simple model. Such is the situation for the manufacturing engineer who has experience with simple interpretable models that provide with knowledge that a complex model with better performance cannot offer. For example, while the data set can be the same for the simple model and the complex model, the classifiers (e.g., complex and simple) are different. For example, with regard to the simple model and complex model, the performance in a setting can be $p(x)=q(x)$ as both the models learn from the same data. However, $p(y|x) \neq q(y|x)$ where $p(y|x)$ and $q(y|x)$ correspond to the outputs of complex and simple classifiers, respectively. Given that it is desired for the performance of the simple model to approach the performance of the complex model, a natural analog to the weights used in a covariate shift is to weight samples by $p(y|x)/q(y|x)$.

With regard to the above description regarding shifted weight samples by $p(y|x)/q(y|x)$, in the case of "hard" samples (e.g., accuracy of the prediction of the samples being low), the potential weighting of such samples would be low as the numerator would be small. However, in the weighting of the easy examples for the complex model, rather than being uniformly weighted high, the weighting is based on the assessment of the simple model. It follows that information stressing inputs that are already extremely easy for the simple model to classify may not lead to the best generalization. Conversely, inputs that are somewhat hard for the simple model but easier for the complex model can be used to enhance the information transfer. Even though easier inputs for the complex model are likely to get higher weights, according to the present disclosure, ranking these inputs based on the simple model's assessment takes into account the simple model's behavior for self-enhancement.

The computer-implemented method and system according to the present disclosure can enhance the accuracy of simple models such as a decision tree or a shallow network given access to a highly accurate complex model to re-weight a training set of the simple models. Examples of such complex models include but are not limited to a deep neural network, boosted trees, etc. The complex models include a re-weighting of a training data set to enhance the accuracy of the simple model. In some cases, the accuracy of a simple model can be enhanced to approach the performance of a complex model.

For example, when the simple model is a decision tree, the small data set of the simple model is used to train the complex model, and then transfer from the complex model to the simple model a decision tree of the same complexity with higher accuracy. The simple model may be preferred by users in part because of its lesser complexity, but according to the present disclosure, there can be enhanced accuracy without an increase in complexity of the model. In an embodiment, performance of the simple model can be enhanced by the output of a complex model if there is a pre-trained network on a large public or private corporate host belonging to the same feature space.

In a case of resource constrained settings, such as in the case of cellphones, the complex model can be used to enhance the accuracy of the simple model. For example, a small neural network can be improved with the help of a larger neural network.

The computer-implemented method and system according to the present disclosure provide an improvement in the accuracy of predictive modeling and an improvement in the efficiency of computer operations. For example, the performance of simple modeling as reweighted according to the present disclosure can reduce the overall carbon footprint when compared to the performance of complex modeling, as well as reduced storage and processing considerations.

Throughout the application, the term 'simple model' refers to one that humans can understand/interpret directly or one that adheres to strict memory constraints.

Example Architecture

FIG. 1 is a block diagram 100 providing an overview of a system and computer-implemented method to leverage simple model predictions for enhancing computational performance, consistent with an illustrative embodiment. A simple model 105, which is shown in FIG. 1 as being a decision tree 110, can also be embodied, for example, as a smaller neural network. The training data set 125 is used to train the low performing model (simple model 105). A complex model 150 can be, for example, a deep neural network 155, a random forest (e.g., a learning algorithm that randomly creates and merges decision trees into one forest, to rely on a collection of learning models rather than just one learning model to improve accuracy), boosted trees, or other models such as generalized linear models. In this example, the neural network 155 has an input layer 165, a first hidden layer 175, and a second hidden later 185, and an output layer 195. It is to be understood that while two hidden layers 175, 185 are shown, there can be any number of hidden layers according to desire. The training data 125 is passed through the complex model 150 data, and the output of the complex model 150 is transferred to a training algorithm of the simple model 105. This configuration permits a reduction of resources, the use of small data settings, as well as permits the use of a simple model that may be favored by a user.

The output value of the complex model 150 includes an indication of hardness (e.g., a probability of accuracy) regarding a prediction of a data point. The complex model 150 indicates to the simple model 105 by the hardness indication whether the prediction of a data point is hard or easy when applying an effort in training. Also, the complex model asks the simple model if the simple model is good at training a particular data point.

Figure 2:
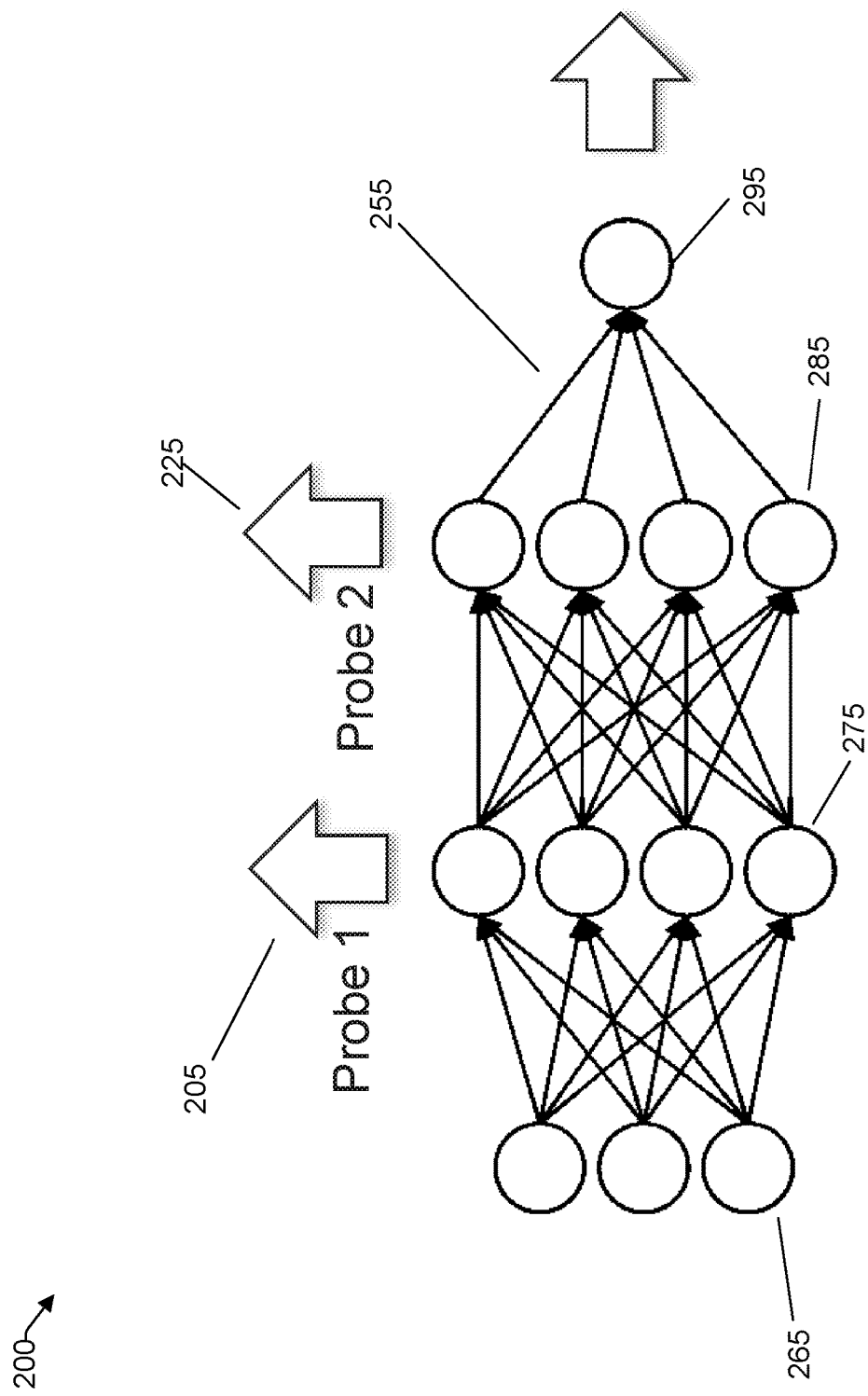
FIG. 2 illustrates the use of probes to judge the hardness of predictability of a data point in a neural network, consistent with an illustrative embodiment.

FIG. 2 illustrates the use of probes to judge the hardness of predictability of a data point in a neural network, consistent with an illustrative embodiment. A neural network 255 is shown in FIG. 2, and it is to be understood that this network can be a deep neural network 255. There is shown an input layer 265, a first hidden layer 275, a second hidden layer 285, and an output layer 295. Two probes 205, 225 are also shown for use with respective hidden layers 275, 285. The probes are used to determine the hardness of each layer. For example, a first probe 205 is used to determine a probability of a first network layer 275 of the complex model to determine a probability of the accuracy of a predictive input. The second probe 225 can be used to determine a probability of the second network layer 285 of the complex model.

In the case of Deep Neural Networks, the attaching of probes, which are essentially linear classifiers trained on intermediate layers of a deep neural network, can be identified as a way of creating graded classifiers, where lower layer probes are likely to be less accurate than those above them for most of the samples. Thus, the idea of probes as simplifications of the complex model, are captured by the definition.

Figure 3:
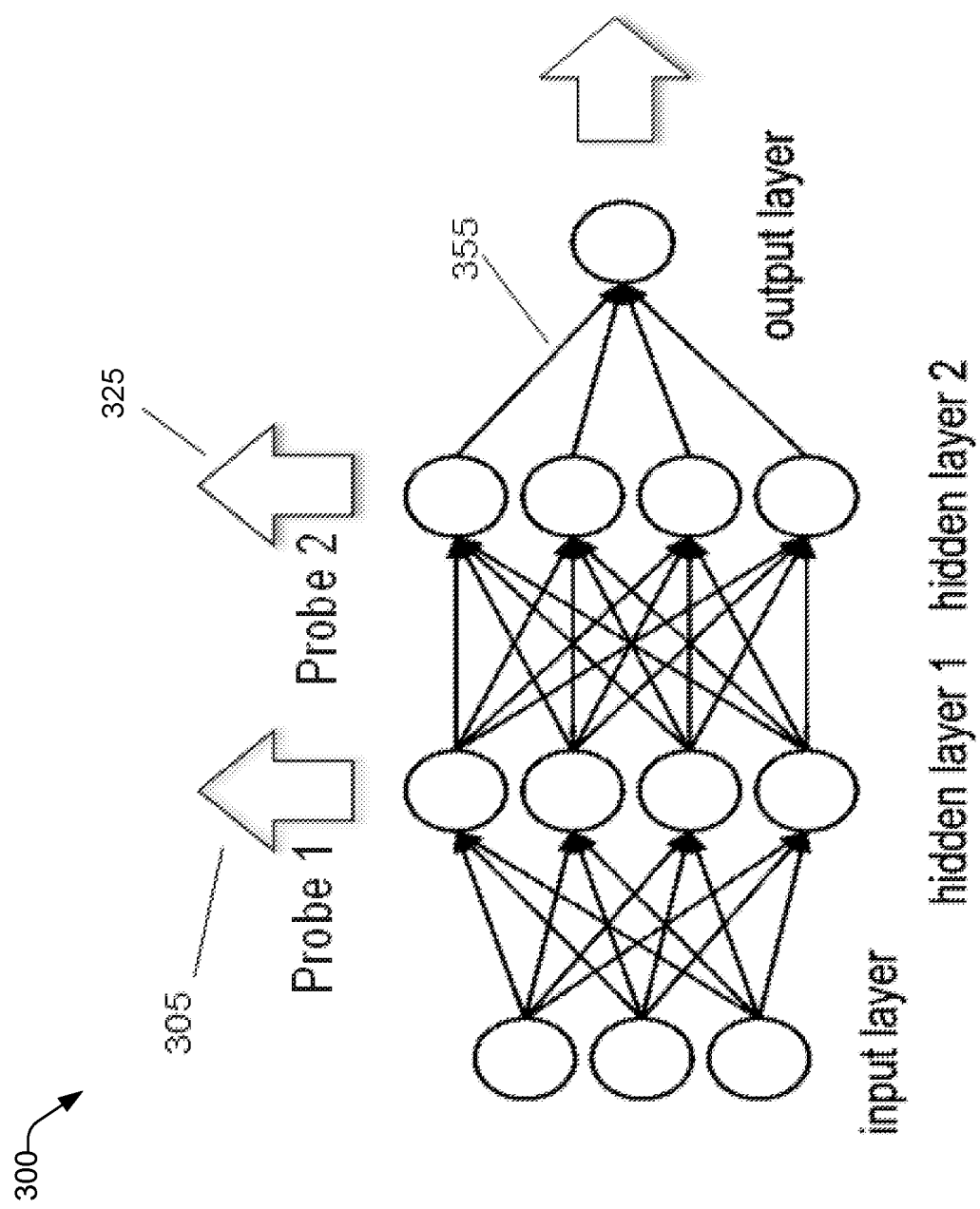
FIG. 3 illustrates an example of using probes to find the area under curve (AUC), consistent with an illustrative embodiment.

FIG. 3 illustrates an example 300 of using probes 305, 325 to find the area under a curve (AUC), consistent with an illustrative embodiment. The area under a curve (AUC) is based on confidence scores at each probe whose accuracy>$\alpha$ of the simple model for each example is based on a complex neural network. The factor $\alpha$ is a margin parameter determining a weakest confidence value of the probes. Each training example can be weighted by a corresponding AUC, and the retraining of simple models such as a decision tree.

Figure 4:
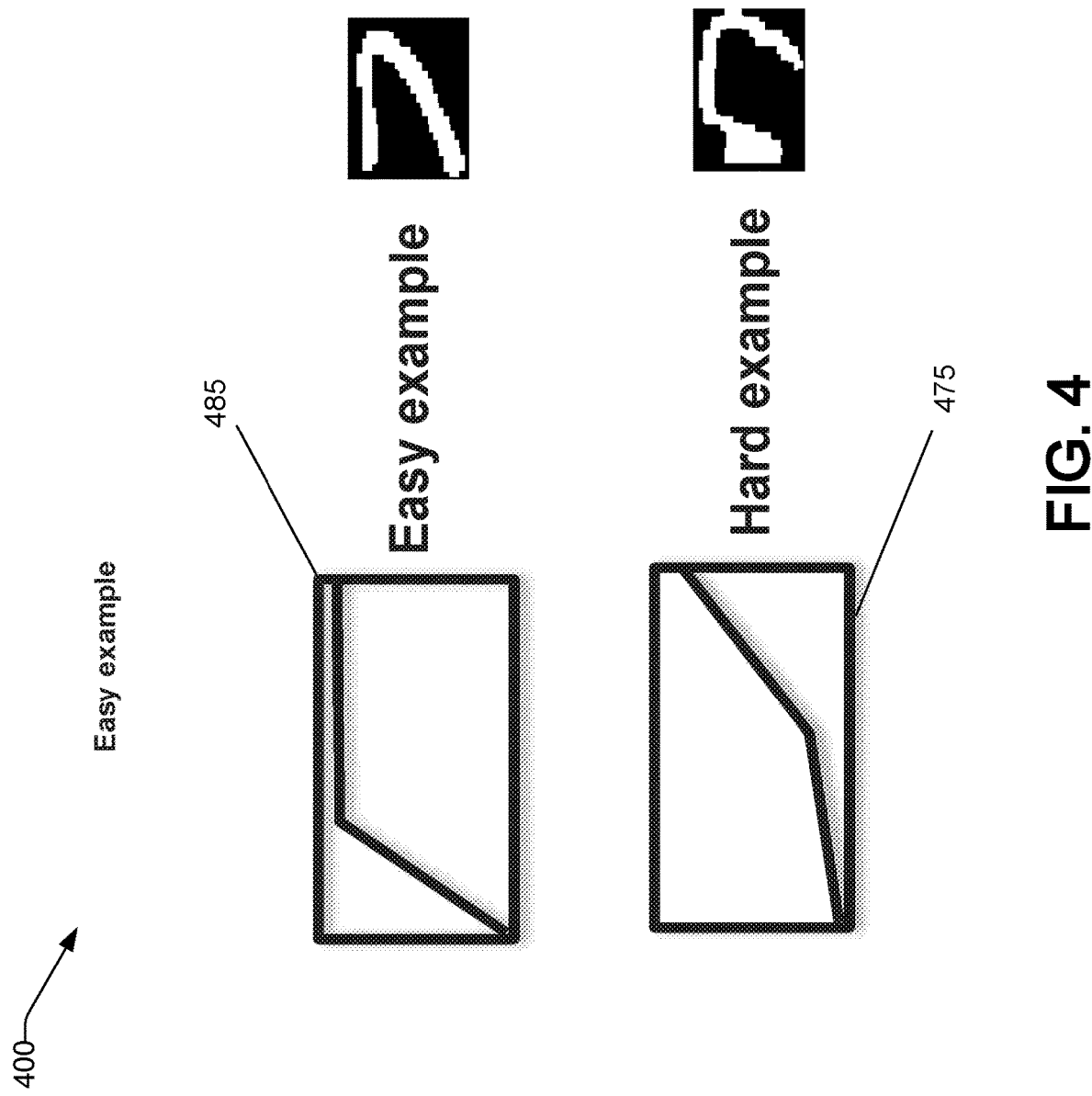
FIG. 4 illustrates confidence profiles of an easy example and a hard example of "7", consistent with an illustrative embodiment.

FIG. 4 illustrates confidence profiles 400 of an easy example and a hard example of "7", consistent with an illustrative embodiment. In the easy example 485, the handwritten mark of 7 can be identified quite readily by the complex model, or the simple model, whereas in the hard example 475, there is a reduced confidence profile because it may take several layers to identify the character. In an easy example 485, one hidden layer or no hidden layers can be used to identify the character 7. In a hard example 475, there may be several layers to identify the character.

Figure 5:
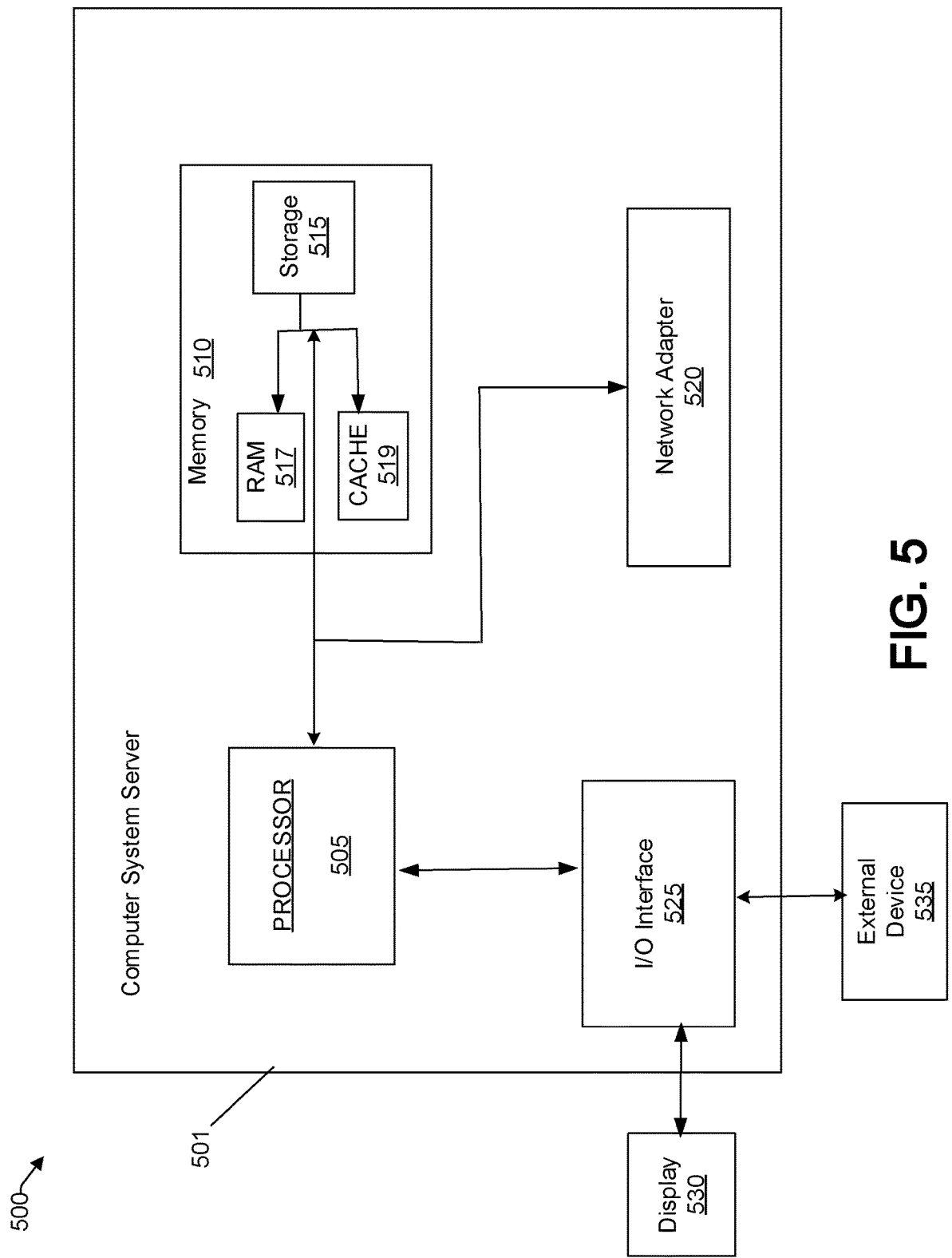
FIG. 5 illustrates a system that leverages simple model predictions for enhancing its performance, consistent with an illustrative embodiment.

FIG. 5 illustrates a system 500 that leverages simple model predictions for enhancing its performance, consistent with an illustrative embodiment. The system 500 includes a server 501 including a processor 505. The processor 505 is coupled to the Memory 510, the Network Adapter 520, and I/O Interface 525. The I/O Interface 525 provides output to both display 530 and to external device 535. The memory 510 can include computer system readable media in the form of volatile memory, such as random access memory (RAM) 517 and/or cache memory 519. Although not shown, a magnetic disk drive for reading from and writing to a removable, non-volatile magnetic disk and an optical disk drive for reading from or writing to a removable, non-volatile optical disk such as a CD-ROM, DVD-ROM or other optical media can be provided. The network adapter 520 communicates with the other components of computer system/server 501 via the processor. It should be understood that, although not shown, other hardware and/or software components could be used in conjunction with an appropriately configured computer system/server.

FIG. 6 illustrates differences of Distillation, Profweight, and SRatio methods consistent with an illustrative embodiment. The SRatio algorithm, which is discussed in more detail and shown in FIG. 7, provides for more flexibility as, many other types of networks can be used other than Neural Networks (NN), and SRatio leverages both complex models and simple models as discussed hereinabove. For example, the Distillation is limited to NN and can only leverage a complex mode. The Profweight method can use any simple model, but the complex model used is neural networks (NN). Thus, the SRatio provides flexibility with regard to the complex model, simple model, and leveraged models. For example, with regard to complex models, the SRatio method can be used with, for example, Boosted Trees, Random Forests, other models that include generalized linear models, and Deep Neural Networks, just to name a few non-liming possibilities.

Below is a table showing the enhanced results of using the SRatio method versus other methods consistent with an illustrative embodiment.

TABLE 1

|  | SM-3 | SM-5 | SM-7 |
|---|---|---|---|
| Standard | 73.15 (±0.7) | 75.78 (±0.5) | 78.76 (±0.35) |
| ConfWeight | 76.27 (±0.48) | 78.54 (±0.36) | 81.46 (±0.50) |
| Distillation | 65.84 (±0.60) | 70.09 (±0.19) | 73.4 (±0.64) |
| ProfWeight | 76.56 (±0.51) | 79.25 (±0.36) | 81.34 (±0.49) |
| SRatio | 77.23 (±0.14) | 80.14 (±0.22) | 81.89 (±0.28) |

Referring to Table 1 above, SRatio shows superior results in every category of Simple Models (SM-3, SM-5, and SM-7)

Example Processes

With the foregoing overview of the example architecture, it may be helpful now to consider a high-level discussion of example processes. To that end, in conjunction with FIGS. 1 and 5, FIG. 7 illustrates an example of an SRatio algorithm 700 consistent with an illustrative embodiment, and FIG. 8 is a flowchart 800 for a computer-implemented method, consistent with an illustrative embodiment.

FIG. 7 shows an example SRatio algorithm 700. It is to be understood that the algorithm 700 is provided for illustrative purposes and is not limited to the operations shown in FIG. 7 and described herein. The algorithm 700 inputs include, for example, graded classifiers, a learning algorithm for simple model Ls, dataset Ds of cardinality N, performance gap parameter $\gamma$, and a maximum allowed ratio parameter $\beta$.

Referring to FIG. 7 (and FIG. 1), at operation (1) the simple model is trained and a computation of its average prediction error. For example, an initial simple model where each input is given a unit weight is obtained.

At operation (2) (e.g., average) prediction errors are computed for the n graded classifiers and the one that is at least $\gamma$ more accurate than the simple model is stored. At operation (3) the weights are computed for all inputs X, where, m is the cardinality of set I and S(x) is the prediction/probability score for the true class of the simple model.

At operation (4), there is a setting of W(x), and at operation (5) the simple model on the dataset D is retained with the corresponding learned weights w, Sw, Ls (Ds, w).

At operation (6), the process returns to Sw.

Figure 8A:
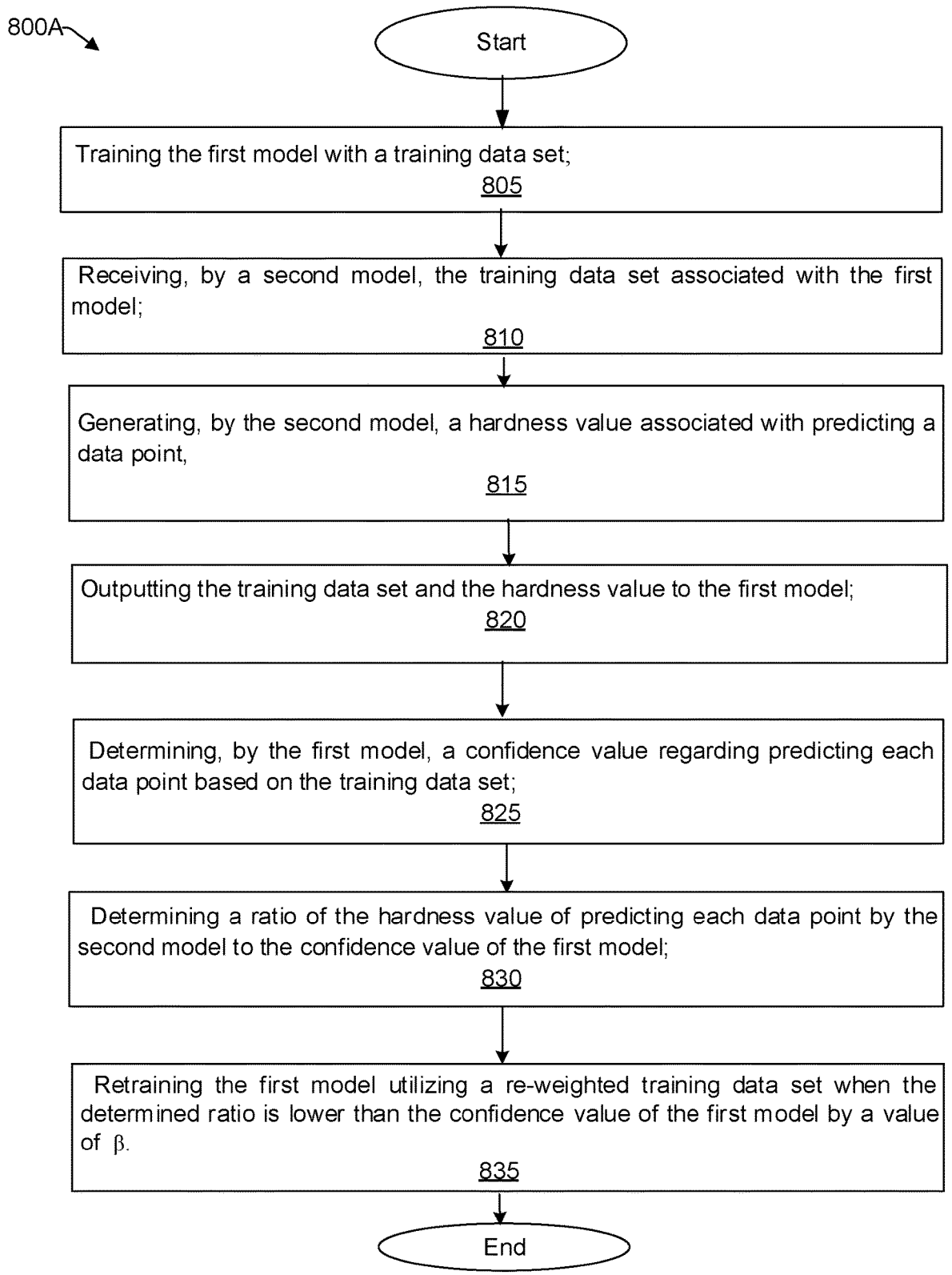
FIG. 8A is a flowchart of computer-implemented method, consistent with an illustrative embodiment.

Reference now is made to FIG. 8A, which is a flowchart 800A of a method to identify anomalies in device operation consistent with an illustrative embodiment.

At operation 805, a simple model is trained by a training data set.

At operation 810, the second model receives the training data set associated with the first model.

At operation 815, the second model makes predictions on the training data set associated with the first model and generating a hardness value associated with predicting each data point of a possible plurality of data points.

At operation 820, the second model outputs the training data set and the hardness value to the first model.

At operation 825, the first model determines a confidence value predicting each data point based on the training data set.

At operation 830, there is a determination of the ratio of the hardness value of predicting each data point with the second model with respect to the confidence value of the first model. In the current embodiment, the first model is configured to determine the ratio because the confidence of the first model may change after the data is re-weighted by the second model. However, the first model can provide the confidence value to the second model, and the second model can calculate the ratio and provide it to the first model At operation 835, the first model utilizes a re-weighted training data to be retrained when the determined ratio is lower than a value of $\beta$. These ratios for each data point are used to create a re-weighted training data set from the initial training data set. The method as illustrated in FIG. 8A can end after operation 835.

Figure 8B:
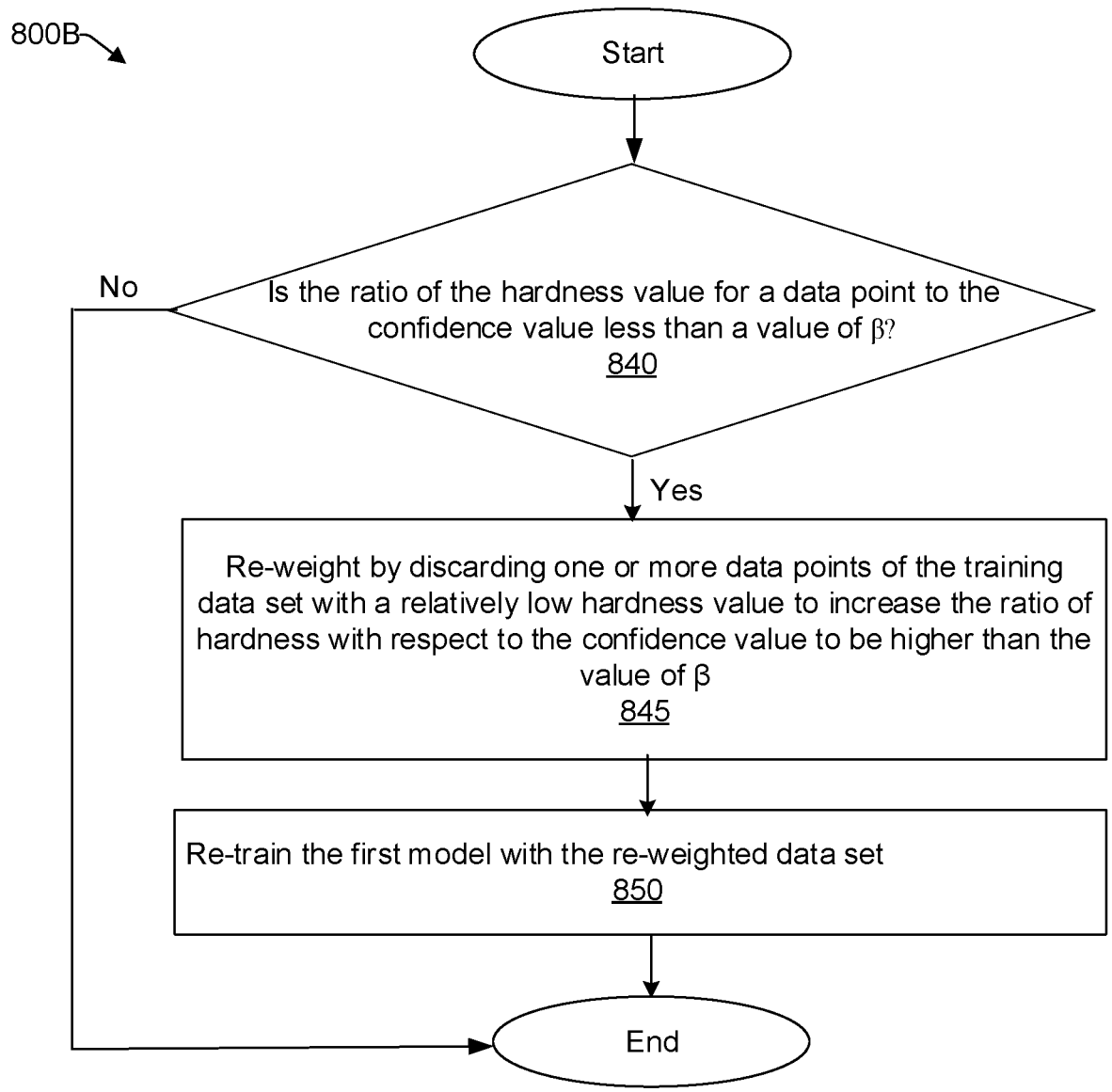
FIG. 8B is a flowchart illustrating the re-weighting process, consistent with an illustrative embodiment.

FIG. 8B is a flowchart illustrating the re-weighting process, consistent with an illustrative embodiment. At operation 840, it is determined whether the ratio of the hardness value for a data point to the confidence value less than a value of $\beta$. When the ratio is less than $\beta$, then at operation 845 a re-weighted training set is created by discarding one or more data points of the training data set with a relatively low hardness value to increase the ratio of hardness with respect to the confidence value to be higher than the value of $\beta$ (e.g. the value of $\beta$ is a predetermined value).

At operation 850, the first model is re-trained with the re-weighted data set. The overall performance of the first model is enhanced by the aforementioned operations.

The first model utilizes the re-weighted training data set, while discarding data points so that the ratio is higher than a value of $\beta$.

Figure 9:
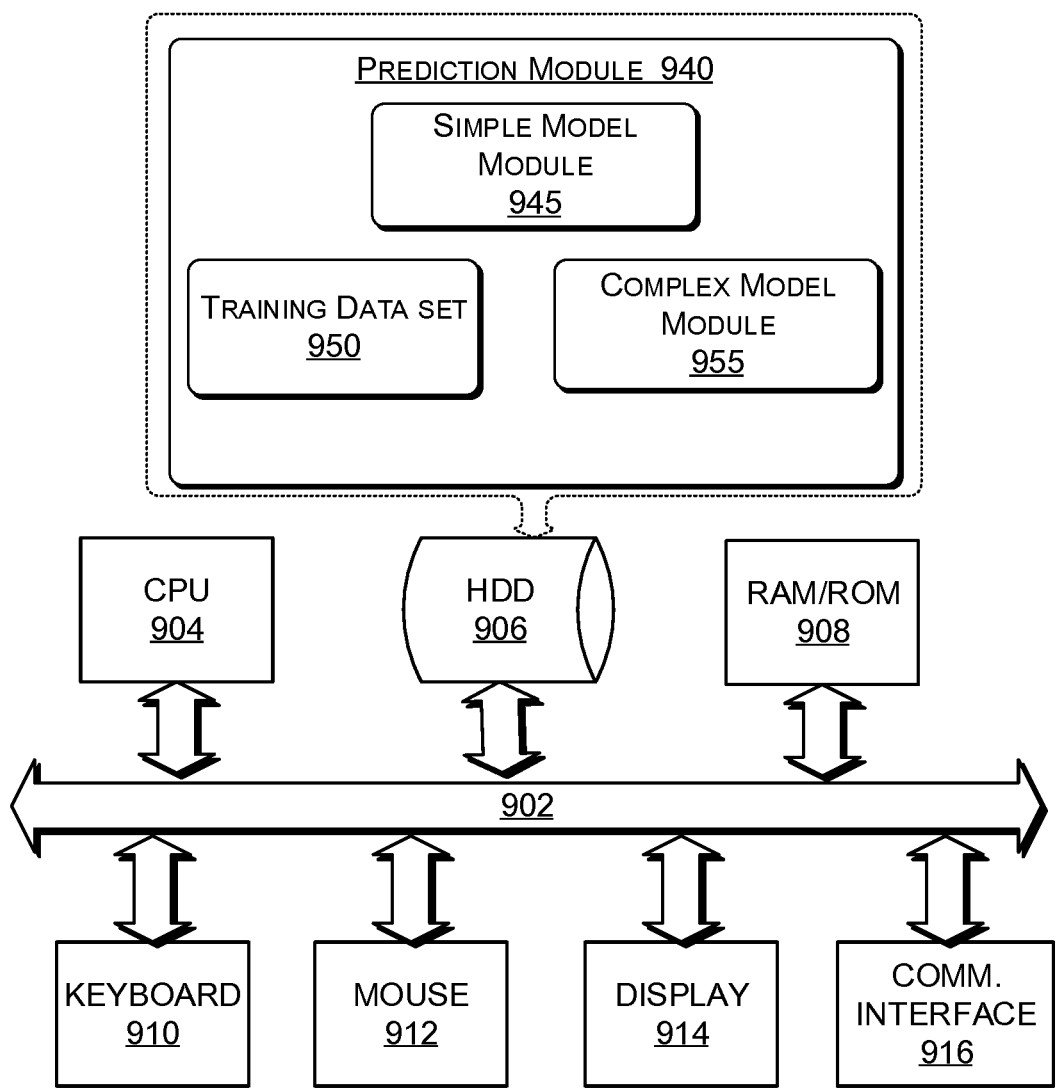
FIG. 9 is a functional block diagram illustration of a particularly configured computer hardware platform, consistent with an illustrative embodiment.

FIG. 9 provides a functional block diagram illustration of a computer hardware platform that is capable of communicating with a system as discussed herein. In particular, FIG. 9 illustrates a particularly configured network or host computer platform 900, as may be used to implement the method for leveraging simple model predictions for enhancing performance shown in FIG. 1.

The computer platform 900 may include a central processing unit (CPU) 904, a hard disk drive (HDD) 906, random access memory (RAM) and/or read-only memory (ROM) 908, a keyboard 910, a mouse 912, a display 914, and a communication interface 916, which are connected to a system bus 902.

In one embodiment, the HDD 906, has capabilities that include storing a program that can execute various processes, such as prediction module 940, in a manner described herein. The prediction module 940 may have various modules configured to perform different functions. The HDD 906 can include data stores.

For example, there may be a training data set 950 for the simple model, and the training data set 950 may have its data reweighted by the complex model module 955 during a training phase. A simple model module 945 is configured to be retrained with the re-weighted training data set by complex module 955.

In one embodiment, a program, such as Apache™, can be stored for operating the system as a Web server. In one embodiment, the HDD 906 can store an executing application that includes one or more library software modules, such as those for the Java™ Runtime Environment program for realizing a JVM (Java™ virtual machine).

Example Cloud Platform

Figure 10:
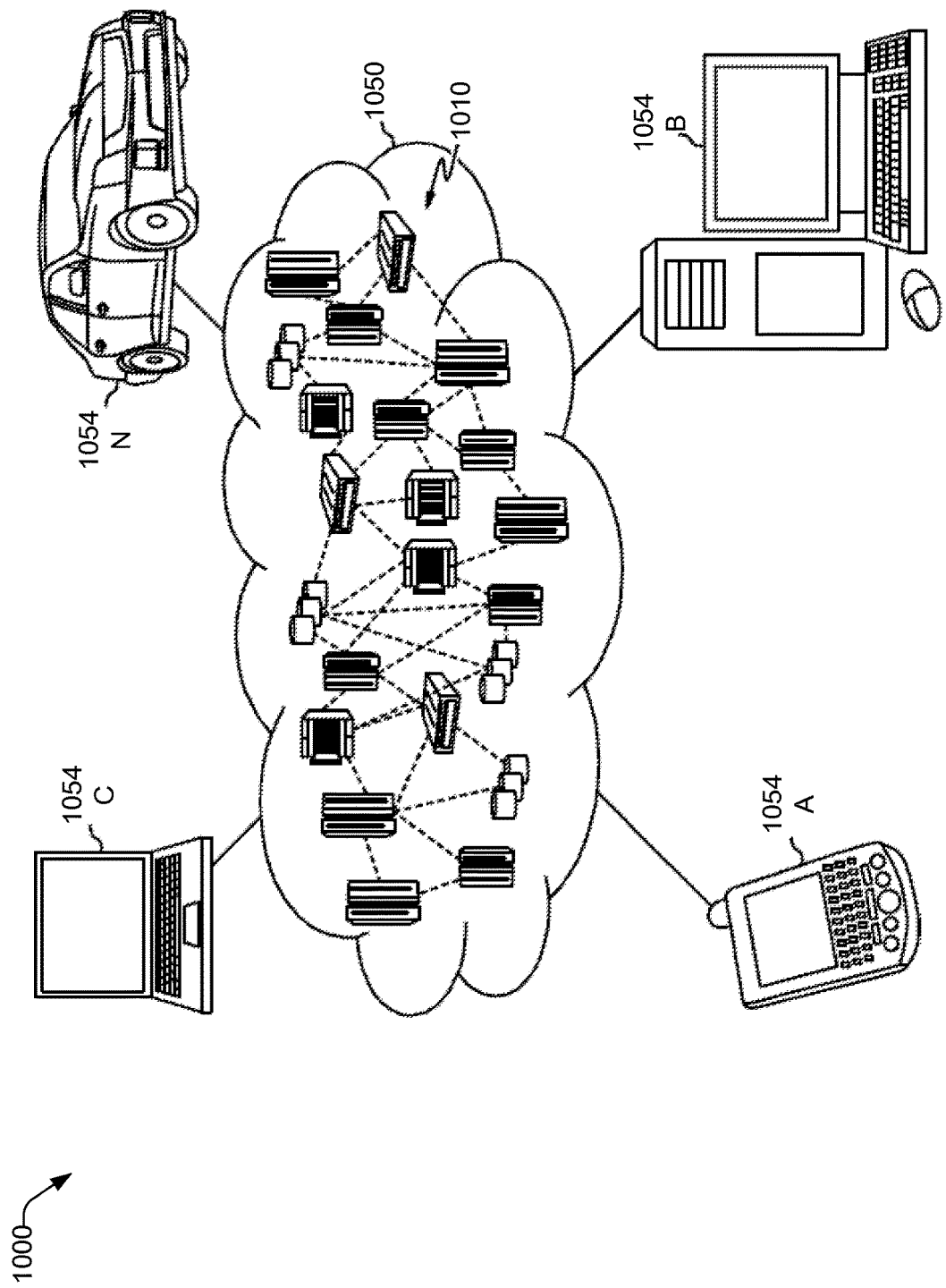
FIG. 10 depicts an illustrative cloud computing environment utilizing cloud computing.

As discussed above, functions relating to environmental and ecological optimization methods may include a cloud 1050 (see FIG. 10). It is to be understood that although this disclosure includes a detailed description of cloud computing as discussed hereinbelow, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Referring now to FIG. 10, an illustrative cloud computing environment 1000 utilizing cloud computing is depicted. As shown, cloud computing environment 1000 includes cloud 1050 having one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms, and/or software as services for which a cloud consumer does not need to maintain resources on a local computing device. It is understood that the types of computing devices 1054A-N shown in FIG. 10 are intended to be illustrative only and that computing nodes 1010 and cloud computing environment 1050 can communicate with any type of computerized device over any type of network and/or network addressable connection (e.g., using a web browser).

Figure 11:
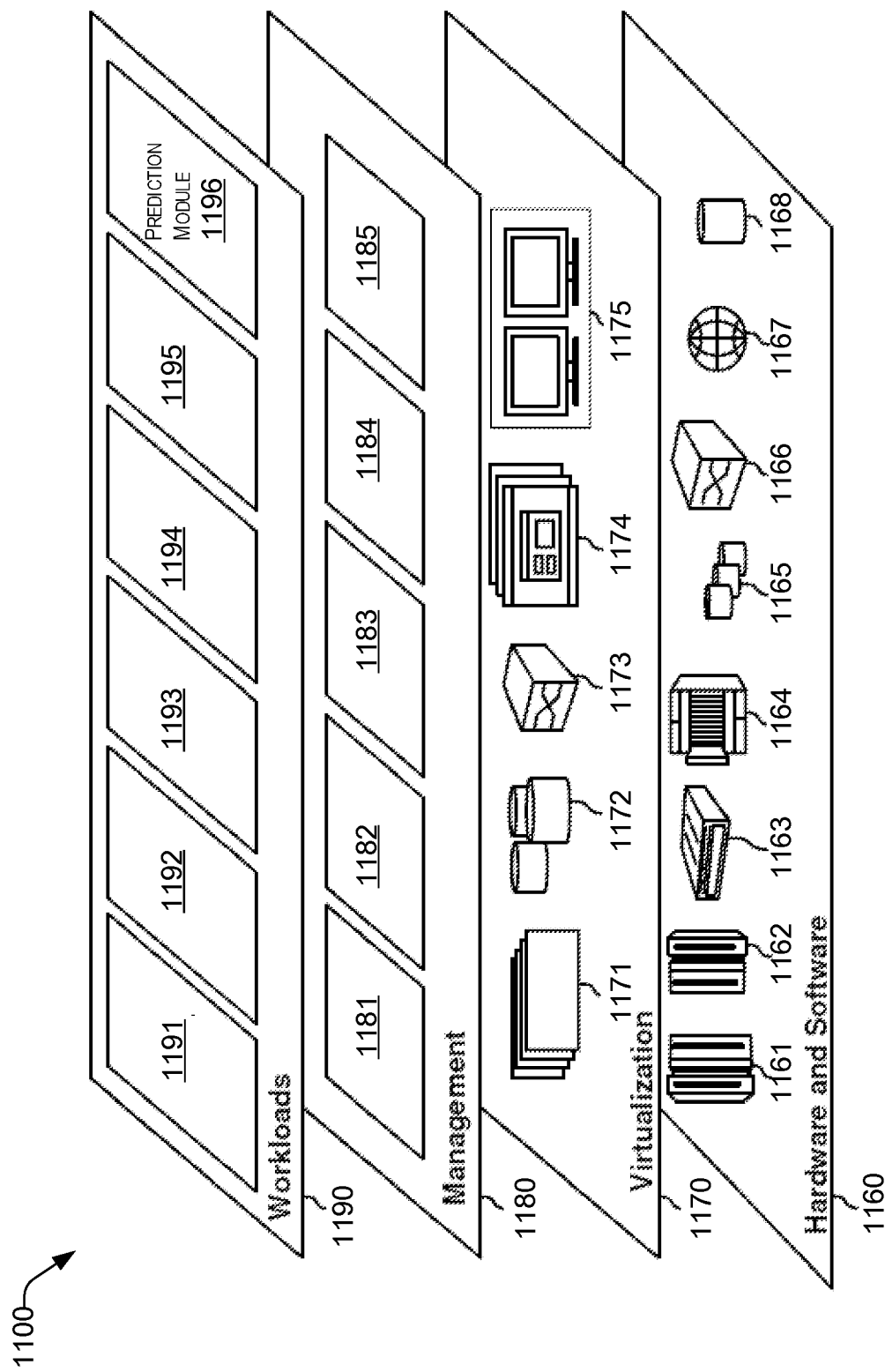
FIG. 11 depicts a set of functional abstraction layers provided by a cloud computing environment.

Referring now to FIG. 11, a set of functional abstraction layers provided by cloud computing environment 1100 (FIG. 11) is shown. It should be understood in advance that the components, layers, and functions shown in FIG. 11 are intended to be illustrative only and embodiments of the disclosure are not limited thereto. As depicted, the following layers and corresponding functions are provided:

Hardware and software layer 1160 include hardware and software components. Examples of hardware components include: mainframes 1161; RISC (Reduced Instruction Set Computer) architecture based servers 1162; servers 1163; blade servers 1164; storage devices 1165; and networks and networking components 1166. In some embodiments, software components include network application server software 1167 and database software 1168.

Virtualization layer 1170 provides an abstraction layer from which the following examples of virtual entities may be provided: virtual servers 1171; virtual storage 1172; virtual networks 1173, including virtual private networks; virtual applications and operating systems 1174; and virtual clients 1175.

In one example, management layer 1180 may provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment may be utilized. Examples of workloads and functions which may be provided from this layer include: mapping and navigation 1191; software development and lifecycle management 1192; virtual classroom education delivery 1193; data analytics processing 1194; transaction processing 1195; and a prediction module 1196, as discussed herein.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits, and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

The flowchart, and diagrams in the figures herein illustrate the architecture, functionality, and operation of possible implementations according to various embodiments of the present disclosure.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method for enhancing performance of a first model, the method comprising:
   training the first model with a training data set associated with the first model;
   receiving, by a second model, the training data set associated with the first model;
   generating, by the second model, a hardness value associated with a prediction of each data point on the training data set;
   outputting the training data set and the hardness value to the first model;
   determining, by the first model, a confidence value regarding predicting each data point based on the training data set;
   determining a ratio of the hardness value of predicting each data point by the second model, with respect to the confidence value of the first model; and
   retraining the first model utilizing a re-weighted training data set when the determined ratio is lower than a value of $\beta$.

2. The computer-implemented method according to claim 1, further comprising:
generating the re-weighted training data set from the training data set based on the ratio of hardness value of predicting each data point with respect to the confidence value, and discarding one or more data points to increase the ratio of hardness with respect to the confidence value to be higher than the value of $\beta$.

3. The computer-implemented method according to claim 2, wherein:
the first model comprises a simple model; and
the second model is a complex model comprising at least one of a boosted tree, a random forest, or a non-ensembled model.

4. The computer-implemented method according to claim 2, wherein:
the first model comprises a simple model having a decision tree that is less than or equal to a predetermined size; and
the second model is a complex model comprising a deep neural network configured to perform the re-weighting of the training data set.

5. The computer-implemented method according to claim 4, further comprising determining an area under a curve (AUC) based on the confidence value at each probe whose accuracy is greater than a factor $\alpha$ of the simple model for each sample based on the complex model, where $\alpha$ is a margin parameter determining a weakest confidence value.

6. The computer-implemented method according to claim 5, further comprising:
re-weighting each training data set by a corresponding AUC; and
retraining the simple model.

7. The computer-implemented method according to claim 1, wherein the training data set comprises one or more classifiers, a dataset, a performance gap parameter, and a maximum allowed ratio parameter, and the method further comprising:
computing at least one prediction error for the one or more classifiers; and
storing the classifiers having computed prediction errors that have been determined to be at least as accurate as the performance gap parameter.

8. The computer-implemented method according to claim 7, further comprising averaging confidence values over a plurality of outputs of the complex model.

9. The computer-implemented method of claim 1, wherein the hardness value is determined by applying at least a first probe to a first network layer of the second model to determine a probability of accuracy of a prediction of an input.

10. The computer-implemented method of claim 9, further comprising applying a second probe to a second network layer, wherein the hardness value is based on a number of probes applied to respective network layers.

11. A system for enhancing predictive performance of a simple model, comprising:
a processor configured to operate a simple model; and
a memory coupled to the processor, the memory storing instructions to cause the processor to perform acts comprising:
providing to a complex model a training data set associated with the simple model;
receiving the training data set and a hardness value generated by a complex model associated with a prediction of each data point; and
retraining the simple model utilizing a re-weighted training data set generated by the complex model,
wherein the simple model is configured to retrain utilizing the re-weighted training data when a ratio of the hardness value of predicting the data point with respect to the confidence value of the simple model, is lower than a value of $\beta$.

12. The system according to claim 11, wherein the simple model is configured to generate the re-weighted training data set from the training data set based on the ratio of hardness value of predicting each data point with respect to the confidence value, and to discard one or more data points so that the ratio of hardness with respect to the confidence value is higher than the value of $\beta$.

13. The system according to claim 11, wherein the simple model comprises one of a decision tree that is less than or equal to a predetermined size, or a smaller neural network.

14. The system according to claim 11, wherein the complex model comprises a deep neural network.

15. The system according to claim 11, wherein the complex model comprises at least one of a boosted tree, a random forest, or a non-ensembled model.

16. The system according to claim 11, further comprising an input-output (I/O) interface coupled to the processor, and wherein the memory stores additional instructions to cause the processor to provide the training data set to the complex model via the I/O interface.

17. The system according to claim 11, wherein the complex model is cloud-based.

18. A non-transitory computer-readable storage medium tangibly embodying a computer-readable program code having computer-readable instructions that, when executed, causes a computer device to perform a method of enhancing performance of a simple model, the method comprising:
training the simple model with a training data set associated with the simple model;
receiving, by a complex model, the training data set associated with the simple model;
generating by the complex model a hardness value associated with a prediction of each data point,
outputting the training data set and the hardness value to the simple model;
determining, by the simple model, a confidence value regarding predicting each data point based on the training data set;
determining a ratio of the hardness value of predicting each data point by the complex model with respect to the confidence value of the simple model; and
retraining the simple model utilizing a re-weighted training data set when the determined ratio is lower than a value of $\beta$.

19. The computer-readable storage medium according to claim 18, wherein the training data set comprises one or more classifiers, a data set, a performance gap parameter, and a maximum allowed ratio parameter, and the method further comprises:
computing at least one prediction error for the one or more classifiers; and
storing the classifiers having computed prediction errors at least as accurate as the performance gap parameter.

* * * * *